United States Patent
Scragg

(10) Patent No.: US 12,515,150 B2
(45) Date of Patent: Jan. 6, 2026

(54) POSITIVE-PRESSURE NON-AGITATING LIQUID FILTRATION

(71) Applicant: John Edgar Scragg, Durban (ZA)

(72) Inventor: John Edgar Scragg, Durban (ZA)

( * ) Notice: Subject to any disclaimer, the term of this patent is extended or adjusted under 35 U.S.C. 154(b) by 367 days.

(21) Appl. No.: 18/029,727

(22) PCT Filed: Oct. 1, 2021

(86) PCT No.: PCT/IB2021/059044
§ 371 (c)(1),
(2) Date: Mar. 31, 2023

(87) PCT Pub. No.: WO2022/074527
PCT Pub. Date: Apr. 14, 2022

(65) Prior Publication Data
US 2023/0226471 A1 Jul. 20, 2023

(30) Foreign Application Priority Data
Oct. 5, 2020 (ZA) .................. 2020/06140

(51) Int. Cl.
*B01D 35/027* (2006.01)
*B01D 27/00* (2006.01)
(Continued)

(52) U.S. Cl.
CPC ......... *B01D 35/0276* (2013.01); *B01D 27/00* (2013.01); *B01D 35/153* (2013.01);
(Continued)

(58) Field of Classification Search
CPC .. B01D 35/0276; B01D 27/00; B01D 35/153; B01D 35/16; B01D 36/006; B01D 2201/204; B01D 2313/243; B01D 36/04
See application file for complete search history.

(56) References Cited

U.S. PATENT DOCUMENTS 3,389,801 A * 6/1968 Sieger .................... F02M 37/16
210/309
4,861,467 A 8/1989 Fukuhara
(Continued)

FOREIGN PATENT DOCUMENTS

CN   107050909   8/2017
DE   3222585     12/1983
(Continued)

OTHER PUBLICATIONS

International Search Report and the Written Opinion Dated Nov. 11, 2021 From the International Searching Authority Re. Application No. PCT/IB2021/059044. (8 Pages).

*Primary Examiner* — Terry K Cecil

(57) ABSTRACT

Contaminants are removed from a liquid (12) in a storage vessel (14), by using a working liquid to varying the volume of a working cavity (44) sequentially inside a working vessel (16) and using the variations in the volume of the working cavity (44) to vary the volume of a suction cavity (20). The working cavity (44) is defined in a working vessel (18) and the suction cavity (20) is defined in a suction vessel (26) and the vessels (16, 18) are configured so that the volumes of their internal cavities (20, 44) are inter-dependent. Using non-return mechanisms (26, 36) to ensure one-way from the storage vessel (14) via the suction cavity (20) to a filter (28) and back to the storage vessel (14).

16 Claims, 2 Drawing Sheets

(51) Int. Cl.
*B01D 35/153* (2006.01)
*B01D 35/16* (2006.01)
*B01D 36/00* (2006.01)

(52) U.S. Cl.
CPC .......... *B01D 35/16* (2013.01); *B01D 36/006* (2013.01); *B01D 2201/204* (2013.01)

(56) References Cited

U.S. PATENT DOCUMENTS

| | | |
|---|---|---|
| 5,635,080 A | 6/1997 | Hensley |
| 8,795,521 B1 | 8/2014 | McBride |

FOREIGN PATENT DOCUMENTS

| | | |
|---|---|---|
| DE | 19609003 A1 | 10/1996 |
| DE | 19625629 | 1/1997 |
| RU | 2687903 | 5/2019 |

* cited by examiner

_US 12,515,150 B2_

POSITIVE-PRESSURE NON-AGITATING LIQUID FILTRATION

RELATED APPLICATIONS

This application is a National Phase of PCT Patent Application No. PCT/IB2021/059044 having International filing date of Oct. 1, 2021, which claims the benefit of priority of South Africa Patent Application No. 2020/06140 filed on Oct. 5, 2020. The contents of the above applications are all incorporated by reference as if fully set forth herein in their entirety.

FIELD OF THE INVENTION

This invention relates to the removal from contaminants from liquids stored in vessels. The invention is particularly useful for filtration of liquid fuels stored in tanks, but can be applied to any liquid stored in a vessel in which contaminants typically collect at the bottom of the vessel. Accordingly, even though the invention is described with reference to fuel storage as examples, the invention is not limited to fuel storage.

BACKGROUND TO THE INVENTION

Storage tanks containing fuels or other liquids often become contaminated with particulate matter and/or water (or other contaminants) over time. The contamination typically results from poor housekeeping and/or condensation due to ambient temperature changes that cause airborne moisture to condense in the tank. The dirt and water collects at the bottom of the tank and needs to be removed before it is drawn up through an outlet such as a fuel pickup pipe for feeding fuels like diesel from the tank to an engine.

Current systems for removing contaminants from liquids stored in tanks, employ conventional pumps that draw the contaminated liquids from the bottoms of the tanks. With this method, the contaminants pass through the pumps and there is a risk that the contaminants will be agitated by the action of the pump, so that the contaminants and the liquid mixes to a degree where effective removal of the contaminants becomes difficult. E.g. if diesel and free water passes through the pump during such as process, the diesel and water can emulsify and separating the emulsion to get the diesel back to specification, will be costly and/or time consuming. Some methods filter the liquid drawn off the tank, to remove contaminants before they reach the pump, however if the contamination is extensive it can overwhelm the filter, so that contaminates still pass through the filter and the pump—where the contaminant and liquid are mixed by the pump, which makes it difficult to remove the contaminants from the liquid.

The present invention seeks to provide for the efficient removal of contaminants from liquids stored in vessels, without agitating the contaminants, preferably using compact apparatus that can be retrofitted on existing vessels and that operate quietly.

SUMMARY OF THE INVENTION

According to a first aspect of the present invention there is provided a method of removing contaminants from a liquid stored in a storage vessel, said method comprising:
  providing a working vessel defining a working cavity with a variable volume and a suction vessel defining a suction cavity with a variable volume, said working vessel and suction vessel being configured such that the volume of the suction cavity changes in response to changes in the volume of the working cavity;
  causing working fluid to flow sequentially into the working cavity and out of the working cavity, causing the working vessel to expand and contract sequentially, and thereby causing the volume of the suction cavity to change sequentially;
  allowing the liquid to flow from a suction inlet in the vicinity of the bottom of the storage vessel, to the suction cavity, but preventing a return flow from the suction cavity to the storage vessel;
  allowing liquid to flow from the suction cavity to a filter, but preventing a return flow of the liquid from the filter to the suction cavity; and
  filtering the liquid in the filter.

The method may include returning the liquid from the filter to the storage vessel.

The working fluid may be working liquid drawn from the storage vessel and the method may include drawing the working liquid from the storage vessel via a working inlet that may be at a higher elevation than the suction inlet, allowing the working liquid to flow into and out of the working cavity, and returning the working liquid to the storage vessel. The working liquid may be returned to the storage vessel along a working return channel that is different from a working supply channel, which extends between the working inlet and working cavity. The working liquid may be filtered while returning from the working cavity to the storage vessel.

The volumes of the working cavity and suction cavity respectively, refer to the effective volume of these cavities that can be filled at a given time According to a second aspect of the present invention there is provided apparatus for removing contaminants from a liquid stored in a storage vessel, said apparatus comprising:
  a working vessel defining a working cavity of variable volume;
  a suction vessel defining a suction cavity of variable volume, said working vessel and suction vessel being configured such that the volume of the suction cavity changes when the volume of the working cavity changes; a pump configured to cause working fluid to flow sequentially into the working cavity and out of the working cavity;
  a suction channel in flow communication between the suction cavity and a suction inlet in the vicinity of the bottom of the storage vessel;
  a suction non-return mechanism that is configured to allow flow along the suction channel from the suction inlet to the suction cavity, but to prevent a return flow from the suction cavity to the storage vessel;
  a filter having an inlet and an outlet;
  a supply channel in flow communication between the suction cavity and the filter inlet; and
  a supply non-return mechanism that is configured to allow flow along the supply channel from the suction cavity to the filter inlet, but to prevent a return flow from the filter inlet to the suction cavity.

The apparatus may include a return channel in flow communication with the filter outlet and the storage vessel.

The apparatus may include a working supply channel in communication between a working inlet in the storage vessel and the working cavity. The working inlet may be at a higher elevation than the suction inlet. The apparatus may include a working return channel in communication between the working cavity and the storage vessel and the working return channel may include a filter.

The working vessel may be at least partly disposed inside the suction vessel, so that changes in the volume of the working cavity inversely change the volume of the suction cavity, and the working vessel may be at least partly flexible, e.g. it may include bellows or a flexible wall such as a membrane.

Alternatively, the working vessel and suction vessel may be connected to each other so that increases in the volume of the working cavity increase the volume of the suction cavity, e.g. the working vessel may be disposed coaxially within the suction vessel. The working vessel and suction vessel may both be at least partly flexible, e.g. they may include bellows.

BRIEF DESCRIPTION OF THE SEVERAL VIEWS OF THE DRAWINGS

For a better understanding of the present invention, and to show how it may be carried into effect, the invention will now be described by way of non-limiting example, with reference to the accompanying drawings in which.

DESCRIPTION OF SPECIFIC EMBODIMENTS OF THE INVENTION

Figure 1:
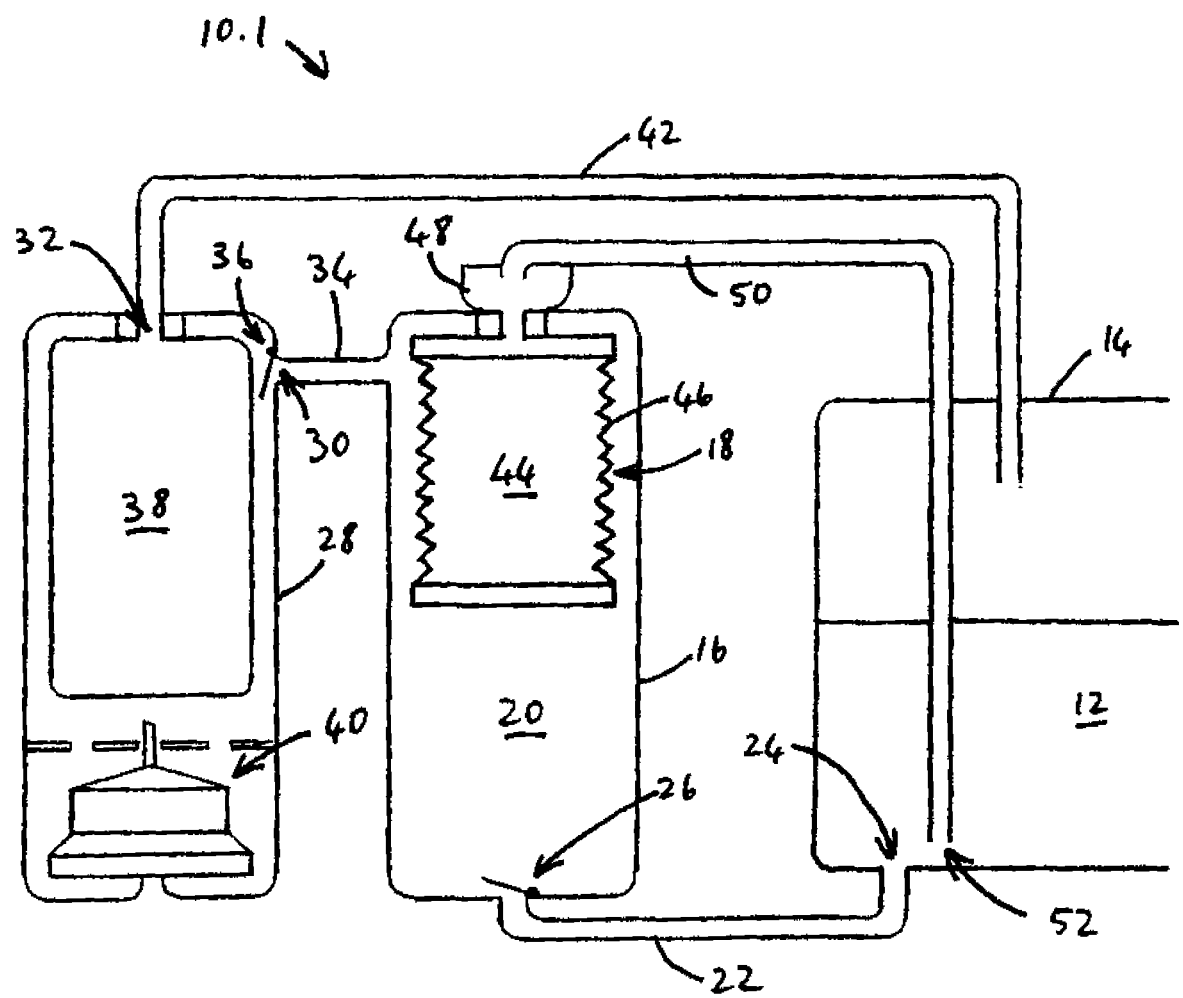
FIG. 1 shows a diagram of a first embodiment of apparatus for removing contaminants from a liquid stored in a storage vessel according to the present invention.

Referring to the drawings apparatus according to the present invention is identified generally by reference sign 10, with suffixes identifying different embodiments of the invention.

The apparatus 10 is intended for removing contaminants from a liquid such as a fuel 12 (or any other liquid) that is stored in a storage vessel such as a fuel tank 14 (or various other suitable vessels).

Referring to FIG. 1, the apparatus 10.1 includes a rigid suction vessel 16 and a working vessel 18 that is at least partly disposed inside the suction vessel so that a suction cavity 20 is defined inside the suction vessel, between the suction vessel and the working vessel.

The suction vessel 16 is connected to the tank 14 by a pipe, tube, or the like that defines a suction channel 22 that is in communication with the cavity inside the tank 14 via a suction inlet 24 in the vicinity of the bottom of the tank. The suction channel 22 is also in communication with the suction cavity 20 and a suction non-return mechanism in the form of a suction non-return valve 26 is provided in the suction channel 22 to allow flow along the suction channel from the suction inlet 24 to the suction cavity 20, but to prevent a return flow in the opposite direction.

The apparatus 10.1 includes a filter 28 with an inlet 30 and an outlet 32 and a pipe, tube, or the like that defines a supply channel 34 that is in flow communication between the suction cavity 20 and the filter inlet 30. A supply non-return mechanism in the form of a supply non-return valve 36 that is configured to allow flow along the supply channel 34 from the suction cavity 20 to the filter inlet 30, but to prevent a return flow in the opposite direction.

In the filter 28, the apparatus 10.1 includes a suitable filter element or filter material, such as a primary filter cartridge 38 that can remove solid contaminants from liquid flowing through the filter from the inlet 30, through the primary filter cartridge, to the outlet 32. In the illustrated embodiment, the filter 28 also includes an automatic purge mechanism 40 that is configured to collect contaminating liquids under gravity and purge them from the filter. The purge mechanism 40 can be a purge mechanism as described in South African Patents Nos. 95/8579 and/or 2016/06216 and is suitable to remove liquids contaminants with a higher density than the liquid that is being filtered, e.g. the purge mechanism is suitable to remove water from fuel 12 that is being filtered.

In other embodiments of the invention, different forms of filter can be used and the filter would typically be selected to be best suited to the contaminants expected to be in the liquid being filtered. The illustrated embodiment of a filter 28 is selected to target the contaminants typically expected in fuel 12 such as diesel, stored in a fuel storage tank 14.

The outlet 32 of the filter 28 is connected to the tank 14 by a pipe, tube, or the like that defines a return channel 42.

The working vessel 18 defines an internal working cavity 44 with a variable volume that can vary because part of the bounding wall of the working vessel is flexible and includes bellows 46. In other embodiments of the invention, the working vessel 18 may include other partly flexible structures such as a flexible wall or a membrane. The flexible part of the working vessel 18, i.e. the bellows 46 in the illustrated example, extends between the working cavity 44 and the suction cavity 20, so that changes in the volume of the working cavity inversely change the volume of the suction cavity 20, i.e. an increase in the volume of the working cavity causes a decrease in the volume of the suction cavity and vice versa.

In the illustrated embodiment of the apparatus 10.1, the working vessel 18 is completely disposed inside the suction vessel 16, but in other embodiments of the invention, the working vessel may be partly inside the suction vessel, or may be adjacent to the suction vessel—as long as there is a movable element (such as the bellows 46) that extends between the working cavity and the suction cavity, so that expansion of the working cavity causes the flexible element (e.g. bellows 46) to flex and causes a volume reduction of the suction cavity 20, and vice versa. Many other configurations can be used in which the volumes of the working cavity and suction cavity vary inversely, e.g. each of the cavities could include a piston with a mechanical connection between the pistons.

The apparatus 10.1 includes a pump 48 which may be a reversible pump or a vacuum pump and includes a pipe, tube, or the like that defines a working supply channel 50 that is in communication between a working inlet 52 inside the tank 14 and the working cavity 44, via the pump. The working inlet 52 is preferably at a higher elevation in the tank 14 than the suction inlet 24, because the suction inlet is intended to withdraw contaminants from the tank 14, whereas the working inlet is intended to draw generally uncontaminated liquid from the tank.

The pump 48 is configured to pump liquid from the working supply channel 50 to the working cavity 44, or from the working cavity to the working supply channel. In the illustrated embodiment of the invention, the pump 48 is configured to pump fuel 12 serving as working liquid, sequentially into the working cavity 44 and out of the working cavity. However, in other embodiments of the invention, two pumps may be provided, for pumping working liquid into and out of the working cavity 44, respectively, or the working vessel 18 may include a bias arrangement such as a spring or a gravitational head and the pump may be configured to pump working fluid only into the working vessel or out of the working vessel, against the bias, while the bias would drive the working liquid in the opposite direction, so the spring or gravity would drive the working liquid in either an extension stroke or an evacuation stroke of the working cavity, while the pump drives the working liquid in the opposite stroke—as long as the working liquid is caused to flow sequentially into and out of the working cavity 44.

The apparatus 10.1 can include a pipe, tube, or the like (not shown in FIG. 1) that defines a working return channel in communication between the working cavity 44 and the tank 14, so that working liquid is returned from the working cavity to the tank 14 via a different channel than the working supply channel 50. In such a configuration, where working liquid flows in only one direction through the working supply channel 50 and working return channel, a filter could be provided in one of these channels, to provide a secondary filter that removes contaminants from the working liquid.

In other embodiments of the invention, the working cavity 44 could be sequentially filled and emptied, at least in part, with a working fluid other than fuel 12 from the tank 14, e.g. fuel from a fuel line feeding an engine can be used—which may be under positive pressure and could obviate the need for the dedicated pump 48, or ambient air could be used, with a compressor instead of the pump. However, the use of fuel 12 from the vessel 44 has the advantages of providing a readily available source of incompressible fluid and allows the option of a secondary filtration step.

In use, in the illustrated embodiment shown in FIG. 1, the pump 48 pumps fuel 12 from the tank 14 via the working supply channel 50 into the working cavity 44, and back, so that the working cavity expands and contracts sequentially. The changes in the volume of the working cavity cause the suction cavity 20 to expand and contract inversely to the working cavity.

When the suction cavity 20 expands, a negative pressure in the suction cavity causes the supply non-return valve 36 to close and the suction non-return valve 26 to open, and causes fuel 12 to flow from the tank 12 via the suction inlet 24 and suction channel 22 into the suction cavity. When the suction cavity 20 contracts, a positive pressure in the suction cavity causes the suction non-return valve 26 to close and the supply non-return valve 36 to open, and causes fuel 12 to flow from the suction cavity to the filter inlet 30. The inverse sequential expansion and contraction of the working cavity 44 and suction cavity 20 thus causes fuel 12 to flow from the tank 14 to the filter 28, without passing over any rapidly moving part of a pump, or more specifically without being driven by an impeller, gears, or any other driving elements of a pump that would agitate the fuel being supplied to the filter 28.

The fuel 12 supplied from the supply channel 34, is filtered in the filter 28 and returned to the tank 14 via the return channel 42. The supply of the fuel to the filter 28 occurs in gentle pulses, caused by the sequential expansion and contraction of the suction cavity 20 and the gentle pulses are preferred for the operation of the purge mechanism 40, which typically requires positive pressure to operate and with the pulses provided by the present invention, the purge mechanism 40 can be installed at a higher elevation than the tank 14.

Figure 2:
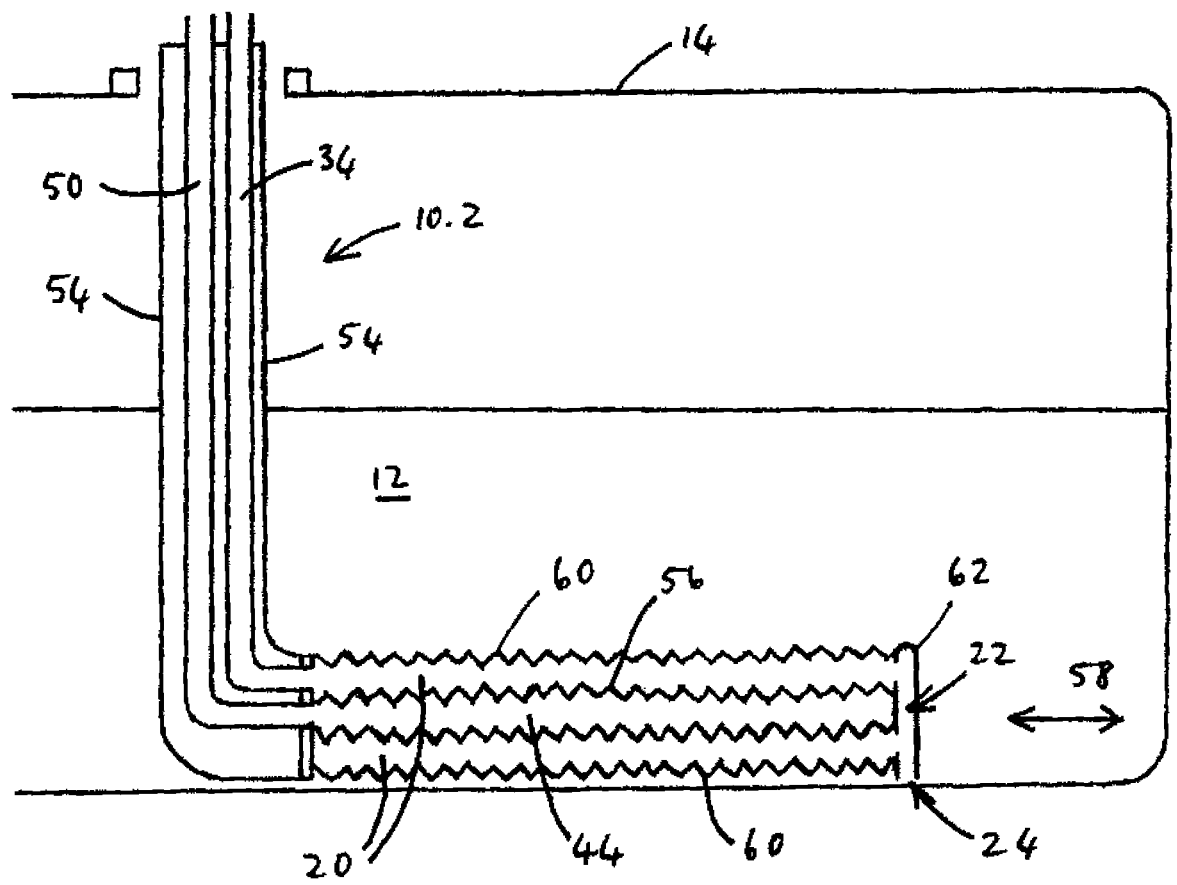
FIG. 2 shows a diagram of a second embodiment of apparatus for removing contaminants from a liquid stored in a storage vessel according to the present invention

Referring to FIG. 2, in a second embodiment of the present invention, the apparatus 10.2 includes a rigid pipe 54 which houses a pipe, hose, or the like that defines the working supply channel 50 and at the end of the rigid pipe, there are central bellows 56 defining the working cavity 44, which is in communication with the working supply channel 50. The working supply channel 50 is connected at its opposite end (not shown) by suitable means, to a supply of a working fluid with a pump, or other suitable driving means, as described above with reference to FIG. 1, or as described above as alternatives to the illustrated embodiments. The working fluid is caused to flow sequentially in opposite directions in the working supply channel 50, into and out of the working cavity 44, causing the working cavity to lengthen and shorten in a longitudinal direction 58, by expansion and contraction of the central bellows 56.

The apparatus 10.2 also includes another pipe, tube, or the like extending inside the rigid pipe 54 and defining a supply channel 34. At the end of the rigid pipe, 54, there are outer bellows 60 that extend coaxially around the central bellows 56 so that a suction cavity 20 is defined in the annular space between the central bellows and outer bellows. The suction cavity 20 is in communication with the supply channel 34.

Both the central bellows 56 and outer bellows 60 are attached to a suction head 62 at their ends opposite from their attachment to the rigid pipe 54. The suction head 62 defines a suction inlet 24 generally at its bottom, and an internal suction channel 22 that is in communication with the suction inlet 24 and with the suction cavity 20. The working cavity 44 is sealed where it meets the suction head 62.

In a preferred embodiment, the rigid pipe 54 can be positioned vertically inside a vessel such as a fuel tank 14 and the central bellows 56 and outer bellows 60 extend generally perpendicularly to the central and outer pipes, so that the bellows can extend generally along the bottom of the tank 14 in the longitudinal direction 58. In other embodiments, pipes, tubes or the like, defining the supply channels 34, 50 can have different configurations and could optionally be coaxial or parallel, as long as they are in communication with the suction cavity 20 and working cavity 44, respectively.

Expansion and contraction of the working cavity 44 causes the central bellows 56 to lengthen and shorten in the longitudinal direction 58, generally along the bottom of the tank 14, and causes the suction head 62 to be moved longitudinally back and forth along the bottom of the tank. At the same time, longitudinal expansion and contraction of the central bellows 56 and working cavity 44, causes the outer bellows 60 and the suction cavity 20 to expand and contract. A suction non-return valve (not shown) is provided at the suction inlet 24 on the suction head 62 and is configured to permit a flow of fuel 12 from the tank 14 from the suction inlet into the suction cavity 20, but not in the opposite direction. Similarly, a supply non-return valve (not shown) is provided in the supply channel 34 and is configured to permit a flow of fuel in the supply channel in a direction away from the suction cavity 20, but to prevent a flow of fuel in the opposite direction.

Unlike the first embodiment of the invention (shown in FIG. 1), in which the volume of the suction cavity varied inversely to the volume of the working cavity, in the second embodiment (shown in FIG. 2), the volume of the suction cavity 20 varies proportionally along with the volume of the working cavity 44, by virtue of the attachment of the bellows' 56, 60 ends to the rigid pipe 54, which serves as a generally static datum, and the opposite ends of both bellows being attached to the suction head 62 that is not fixed. The central bellows 56 and outer bellows 60 perform the function of the working vessel and suction vessel of the first embodiment of the invention (identified by reference signs 18 and 20 in FIG. 1).

The coaxial arrangement of the central bellows 56 inside the outer bellows 60 provides a simple construction in which forces resulting from the longitudinal expansions and contractions, are generally in balance. However, other embodiments of the invention are possible in which the volumes of the working cavity and suction cavity vary simultaneously, e.g. there could be two bellows defining suction cavities on opposing sides of central bellows defining the working cavity, or vice versa. There are also various other possible configurations in which expansion and contraction of a working cavity and suction cavity are linked or interdependent.

In use, the apparatus 10.2 functions similarly to the apparatus shown in FIG. 1, in the sense that working fluid flowing into and out of the working cavity 44 causes the working cavity to expand and contract—which causes the suction cavity 20 to expand and contract. Expansion and contraction of the suction cavity 20, with operation of the non-return valves, causes fuel 12 to be drawn into the suction opening 24, to the suction cavity and towards the filter via the supply channel 34.

Additionally to this operation, the suction head 62 is caused to move reciprocally along the bottom of the tank 14 and draws fuel 12 into the suction opening 24 on each extension stroke, so that the suction head effectively scours the bottom of the tank 14, while drawing in contaminated fuel 12. This allows the suction head 62 to reach the extremities of the tank 14, where contaminants often tend to accumulate.

The invention claimed is:

1. A method of removing contaminants from a liquid in a storage vessel, said method comprising:
    providing a working vessel defining a working cavity with a variable volume and a suction vessel defining a suction cavity with a variable volume, said working vessel and suction vessel being configured such that the volume of the suction cavity changes in response to changes in the volume of the working cavity;
    causing a working fluid to flow sequentially into the working cavity and out of the working cavity, causing the working vessel to expand and contract sequentially, and thereby causing the volume of the suction cavity to change sequentially;
    allowing the liquid to flow from a suction inlet in the vicinity of a bottom of the storage vessel, to the suction cavity, but preventing a return flow of the liquid from the suction cavity to the storage vessel;
    allowing the liquid to flow from the suction cavity to a filter, but preventing a return flow of the liquid from the filter to the suction cavity; and
    filtering the liquid in the filter;
        wherein the working fluid is working liquid drawn from the storage vessel.

2. The method according to claim 1, which includes returning the liquid from the filter to the storage vessel.

3. The method according to claim 1, which includes drawing the working liquid from the storage vessel via a working inlet, allowing the working liquid to flow into and out of the working cavity, and returning the working liquid to the storage vessel.

4. The method according to claim 3, wherein the working inlet is at a higher elevation than the suction inlet.

5. The method according to claim 3, which includes returning the working liquid to the storage vessel along a working return channel that is different from a working supply channel, which extends between the working inlet and working cavity.

6. The method according to claim 5, which includes filtering the working liquid while returning the working liquid from the working cavity to the storage vessel.

7. Apparatus for removing contaminants from a liquid stored in a storage vessel, said apparatus comprising:
    a working vessel defining a working cavity of variable volume;
    a suction vessel defining a suction cavity of variable volume, said working vessel and suction vessel being configured such that the volume of the suction cavity changes when the volume of the working cavity changes;
    a pump configured to cause a working fluid to flow sequentially into the working cavity and out of the working cavity;
    a suction channel in flow communication between the suction cavity and a suction inlet in the vicinity of a bottom of the storage vessel;
    a suction non-return mechanism that is configured to allow flow along the suction channel from the suction inlet to the suction cavity, but to prevent a return flow from the suction cavity to the storage vessel;
    a filter having an inlet and an outlet;
    a supply channel in flow communication between the suction cavity and the filter inlet; and
    a supply non-return mechanism that is configured to allow flow along the supply channel from the suction cavity to the filter inlet, but to prevent a return flow from the filter inlet to the suction cavity;
    wherein said apparatus includes a working supply channel in communication between a working inlet in the storage vessel and the working cavity.

8. Apparatus according to claim 7, wherein said apparatus includes a return channel in flow communication with the filter outlet and the storage vessel.

9. The apparatus according to claim 7, wherein said working inlet that is at a higher elevation than the suction inlet.

10. The apparatus according to claim 7, wherein said apparatus includes a working return channel in communication between the working cavity and the storage vessel.

11. The apparatus according to claim 10, wherein the working return channel includes a filter.

12. The apparatus according to claim 7, wherein the working vessel is at least partly disposed inside the suction vessel, so that changes in the volume of the working cavity inversely change the volume of the suction cavity.

13. The apparatus according to claim 12, wherein the working vessel is at least partly flexible.

14. The apparatus according to claim 7, wherein the working vessel and suction vessel are connected to each other so that increases in the volume of the working cavity increase the volume of the suction cavity.

15. The apparatus according to claim 14, wherein the working vessel is disposed coaxially within the suction vessel.

16. The apparatus according to claim 14, wherein the working vessel and the suction vessel are both at least partly flexible.

* * * * *